(12) United States Patent
Swengler

(10) Patent No.: US 8,180,814 B1
(45) Date of Patent: May 15, 2012

(54) SYSTEM AND METHOD FOR FILE MANAGEMENT

(75) Inventor: Paul Stuart Swengler, Lutz, FL (US)

(73) Assignee: Docbert, LLC, Lutz, FL (US)

( * ) Notice: Subject to any disclaimer, the term of this patent is extended or adjusted under 35 U.S.C. 154(b) by 0 days.

(21) Appl. No.: 13/028,773

(22) Filed: Feb. 16, 2011

(51) Int. Cl.
  *G06F 17/30* (2006.01)
  *G06F 12/00* (2006.01)

(52) U.S. Cl. ...................................................... 707/831

(58) Field of Classification Search .................. 707/831
  See application file for complete search history.

(56) References Cited

U.S. PATENT DOCUMENTS

| | | | |
|---|---|---|---|
| 5,047,918 A | 9/1991 | Schwartz et al. | |
| 5,694,594 A | 12/1997 | Chang | |
| 5,751,287 A | 5/1998 | Hahn et al. | |
| 5,812,995 A | 9/1998 | Sasaki et al. | |
| 5,899,995 A | 5/1999 | Millier et al. | |
| 5,969,720 A | 10/1999 | Lisle et al. | |
| 6,009,442 A | 12/1999 | Chen et al. | |
| 6,307,547 B1 | 10/2001 | Bolnick | |
| 6,477,528 B1 | 11/2002 | Takayama | |
| 6,582,474 B2 | 6/2003 | LaMarca et al. | |
| 6,760,721 B1 | 7/2004 | Chasen et al. | |
| 6,820,094 B1 | 11/2004 | Ferguson et al. | |
| 7,051,277 B2 | 5/2006 | Kephart et al. | |
| 7,069,505 B2 | 6/2006 | Tamano | |
| 7,228,299 B1 | 6/2007 | Harmer et al. | |
| 7,483,895 B2 | 1/2009 | Hysom et al. | |
| 7,499,925 B2 | 3/2009 | Moore et al. | |
| 7,506,010 B2 * | 3/2009 | Kulkarni et al. | ........................ 1/1 |
| 7,533,116 B2 | 5/2009 | Lacy | |
| 2004/0133588 A1 | 7/2004 | Kiessig et al. | |
| 2004/0153468 A1 * | 8/2004 | Paila et al. | ..................... 707/101 |
| 2005/0015816 A1 * | 1/2005 | Christofalo et al. | ........... 725/136 |
| 2007/0168325 A1 | 7/2007 | Bourne et al. | |
| 2008/0040388 A1 | 2/2008 | Petri et al. | |
| 2008/0059495 A1 | 3/2008 | Kiessig et al. | |
| 2008/0059595 A1 * | 3/2008 | Kiss et al. | ..................... 709/206 |
| 2008/0091745 A1 * | 4/2008 | Malik | ............................ 707/204 |
| 2010/0021001 A1 * | 1/2010 | Honsinger et al. | ............. 382/100 |
| 2010/0316292 A1 * | 12/2010 | O'Hara et al. | ................. 382/168 |

FOREIGN PATENT DOCUMENTS

WO        01/97070        12/2001

OTHER PUBLICATIONS

HP, Open VMS documentaion, Open VMS System Manager's Manual, Jun. 15, 2002, pp. 1-8.*
Alexander Ames, et al., Richer File System Metadata Using Links and Attributes, Proceedings of the 22nd IEEE/13th NASA Goddard Conference on Mass Storage Systems and Technologies (MSST 2005), Monterey, CA, Apr. 2005.
Mealling, et al., RFC 4122: A Universally Unique IDentifier (UUID) URN Namespace (The Internet Society, Jul. 2005).

* cited by examiner

*Primary Examiner* — Angela Lie
(74) *Attorney, Agent, or Firm* — Law Office of Steven R. Olsen PLLC; Steven R. Olsen

(57) ABSTRACT

Embodiments of the invention provide, among other things, an improved system and method for building logical associations (links) between files and for assigning attributes to the files and/or links. In embodiments of the invention, such attribute data is indexed in a data store according to Universally Unique Identifiers (UUIDs) in each file header.

20 Claims, 20 Drawing Sheets

SYSTEM AND METHOD FOR FILE MANAGEMENT

FIELD OF INVENTION

The invention relates generally to the field of electronic data storage. In particular, but not by way of limitation, the invention relates to a system and method for managing electronic files and associated data.

BACKGROUND

Various file management systems and methods are known. A typical File Management System (FMS) provides a logical user interface that facilitates the organization of files and provides an interface to one or more physical storage devices.

Conventional systems and methods for managing electronic files have various disadvantages, however. For instance, a typical FMS uses nested folders or a similar hierarchical format to facilitate logical organization. Each stored file is associated with a single logical path. If a user wishes to associate a file with multiple logical groupings, it may be necessary to create a corresponding multiple number of copies of the file. One shortcoming of such systems is that they do not provide an integrated view for each of the file's logical associations with other stored files. Another disadvantage of such systems is that creating a new physical copy of a file for each logical path is not an efficient use of physical storage.

Therefore, a need exists for an improved system and method for building, viewing, and/or managing multiple logical associations for a stored electronic file.

SUMMARY OF THE INVENTION

Embodiments of the invention seek to overcome one or more of the limitations described above. Embodiments of the invention provide, among other things, an improved system and method for building logical associations (links) between files and for assigning attributes to the files and/or links. In embodiments of the invention, such attribute data is indexed in a data store according to Universally Unique Identifiers (UUIDs) in each file header.

Embodiments of the invention provide a file management system. The file management system may include: a virtual file system module configured to provide at least one abstraction of a plurality of files; a media retrieval/storage engine coupled to the virtual file system module; and a data store coupled to the media retrieval/storage system, the data store configured to store file attribute data associated with each of the plurality of files, each of the plurality of files having a universally unique identifier (UUID) in a header, the UUID being independent of a filename, the file attribute data indexed in the data store using the UUID as a unique key.

BRIEF DESCRIPTION OF THE DRAWINGS

Embodiments of the invention are described with reference to the following drawings, wherein.

DETAILED DESCRIPTION

Embodiments of the invention will now be described more fully with reference to FIGS. 1 through 20. The invention may, however, be embodied in many different forms and should not be construed as limited to the embodiments set forth herein. Rather, these embodiments are provided so this disclosure will enable a person having ordinary skill in the art to practice the claimed invention.

In embodiments of the invention, a user can assign attributes to a file. The user can also build links (logical associations between two files or references from one file to another). Such file and link attribute data can be used to enhance file searching, export controls, and/or other file management tasks.

Figure 1:
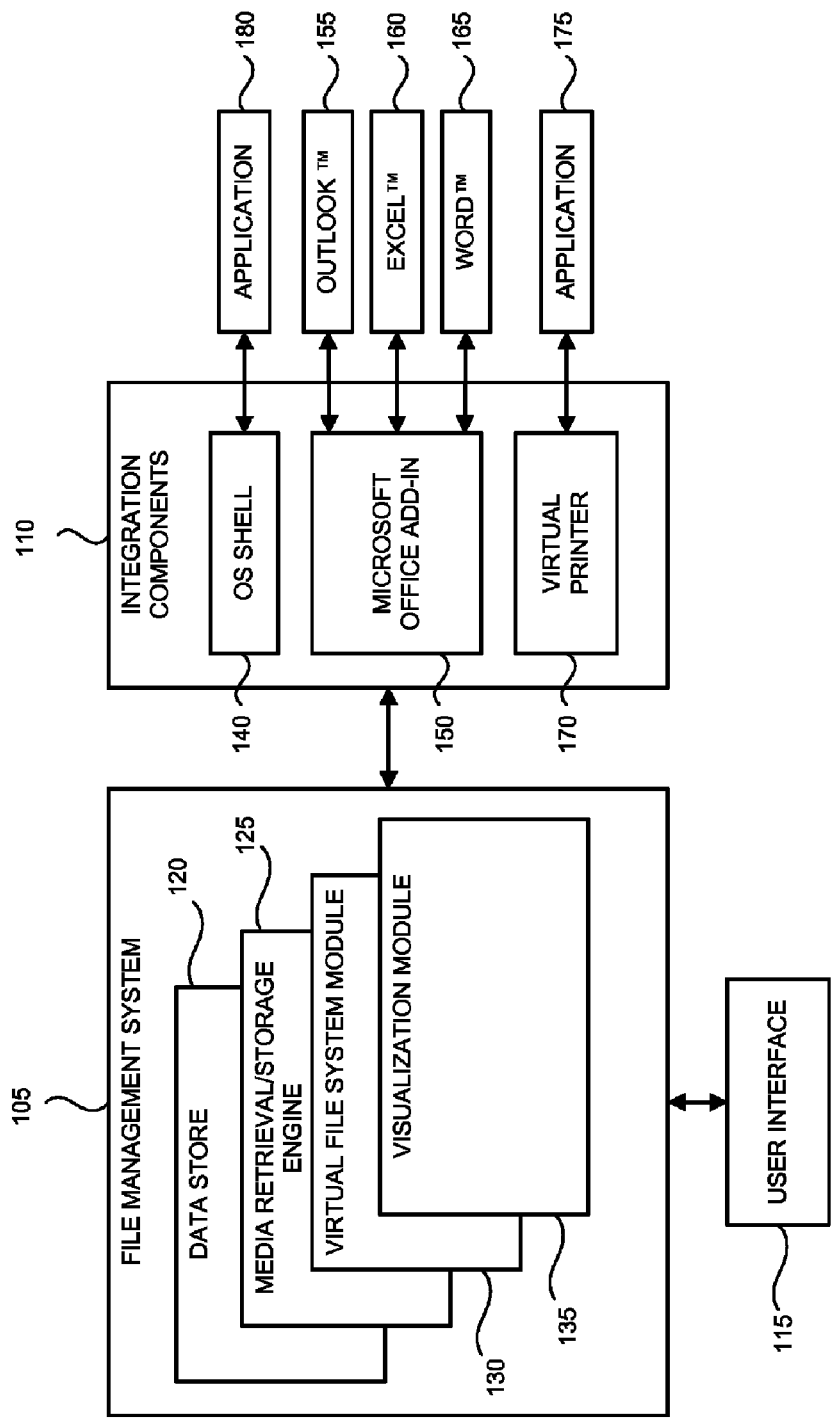
FIG. 1 is a functional block diagram of a computer system, according to an embodiment of the invention.

FIG. 1 is a functional block diagram of a computer system, according to an embodiment of the invention. As illustrated in FIG. 1, a file management system (FMS) 105 is coupled to integration components 110 and a user interface 115. The FMS 105 may include a data store 120, media retrieval/storage engine 125, a virtual file system module 130, and/or a visualization module 135. The integration components 110 may include an OS (Operating System) shell 140, a Microsoft® Office add-in 150, and/or a virtual printer 170. In the illustrated embodiment, an application 180 uses the OS shell 140 to interface to the FMS 105. Office Outlook application 155, Office Excel application 160, and Office Word application 165 are each coupled to the Microsoft® Office add-in 150. Application 175 is coupled to the FMS 105 via the virtual printer 170. Intuit® QuickBooks® is an example of a potential application 175 or 180 that could be coupled to the FMS 105.

In operation, logical links between files and/or other attributes may be associated with electronic files using the virtual file system module 130 and/or visualization module 135. Such links and/or other attributes may be written to or retrieved from the data store 120 using the media retrieval/storage engine 125. Applications 155, 160, 165, 175 and/or 180 may access the FMS 105 via integration components 110.

The FMS 105 is configured to co-operate with the user interface 115. One embodiment of the user interface 115 is described below with reference to FIGS. 4-10 and 15. The media retrieval/storage engine 125 and data store 120 may be configured to operate as described with reference to FIGS. 11 and 12. The FMS 105 may also be configured to execute the link building process described with reference to FIGS. 13 and 14, the key determining process described with reference to FIG. 16, and the export process illustrated in FIGS. 18 and 19.

Variations to the configuration illustrated in FIG. 1 are possible. For instance, in alternative embodiments, links and other attributes stored in the data store 120 could be exploited without the virtual file system module 130 and/or the visualization module 135, according to design choice. Moreover, any one or more of the illustrated integrated components 110 could be used. In other embodiments, alternative integration methods could be used.

Figure 2:
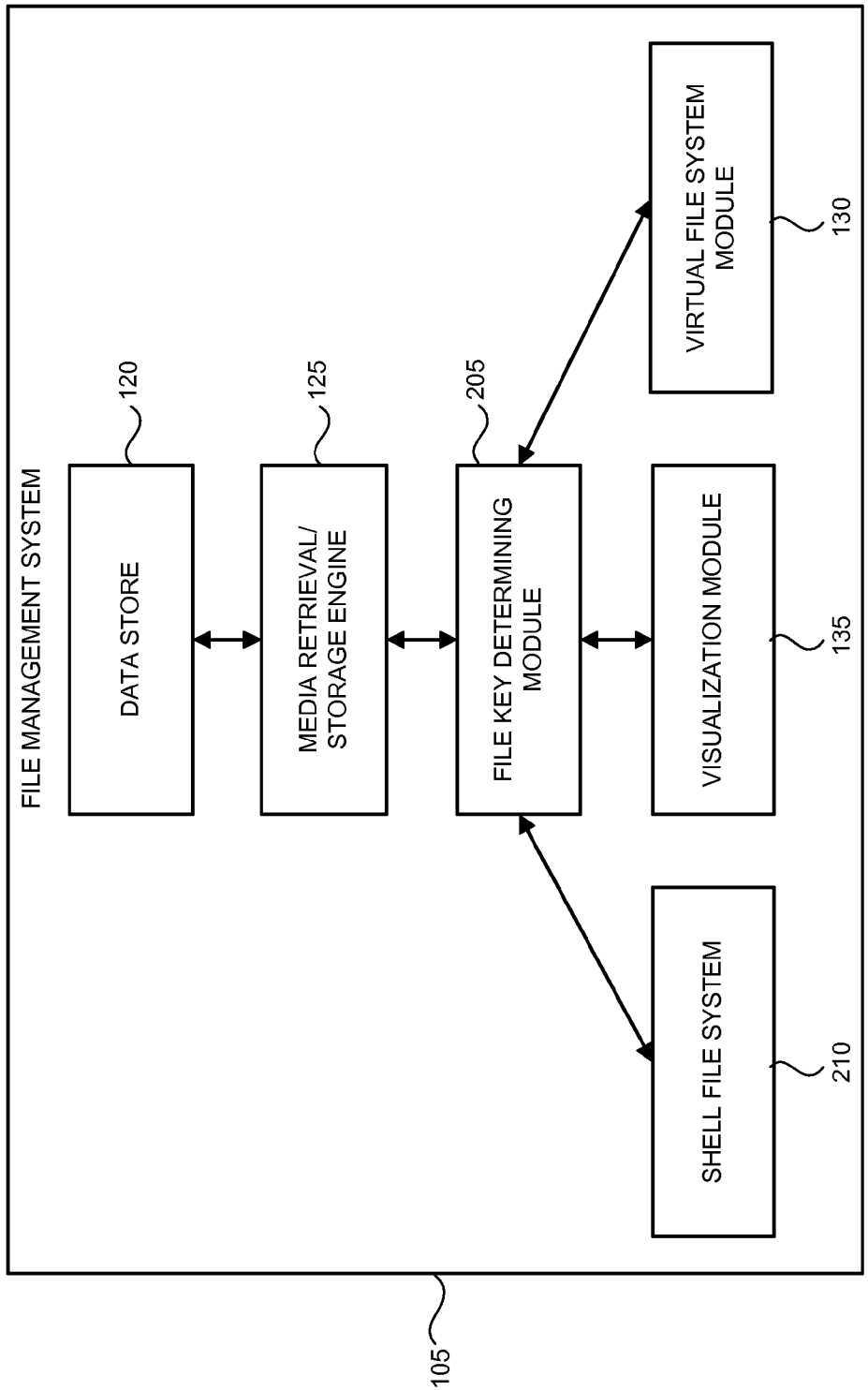
FIG. 2 is a functional block diagram of the file management system in FIG. 1, according to an embodiment of the invention.

FIG. 2 is a functional block diagram of a file management system, according to an embodiment of the invention. As illustrated in FIG. 2, the FMS 105 may include a data store 120 coupled to a media retrieval/storage engine 125. The data store 120 and/or media retrieval/storage engine 125 may be or include, for example, MYSQL, Oracle, SQLITE, Microsoft Access™ or other software. In the illustrated embodiment, the media retrieval/storage engine 125 is coupled to a file key determining module 205. The virtual file system module 130, a visualization module 135, and/or a shell (native) file system 210 may each be coupled to the file key determining module 205.

In operation, the media retrieval/storage engine 125 manages the interface to the data store 120. The link data and other file attributes are associated in the data store 120 using a file key in the form of a Universally Unique Identifier (UUID) rather than a file name. This may be advantageous, for instance, where a user changes file names or creates multiple virtual file names. The file key determining module 205 is thus configured to determine a file key before link data or file attributes are stored in, or retrieved from, the data store 120. The determining could include reading a file key or assigning a file key as described below with reference to FIGS. 16 and 17.

In embodiments of the invention, links can be built and viewed using the visualization module 135 and/or the virtual file system(s) 130, for instance as will be described with reference to FIGS. 4, 13 and 14 below.

Figure 3:
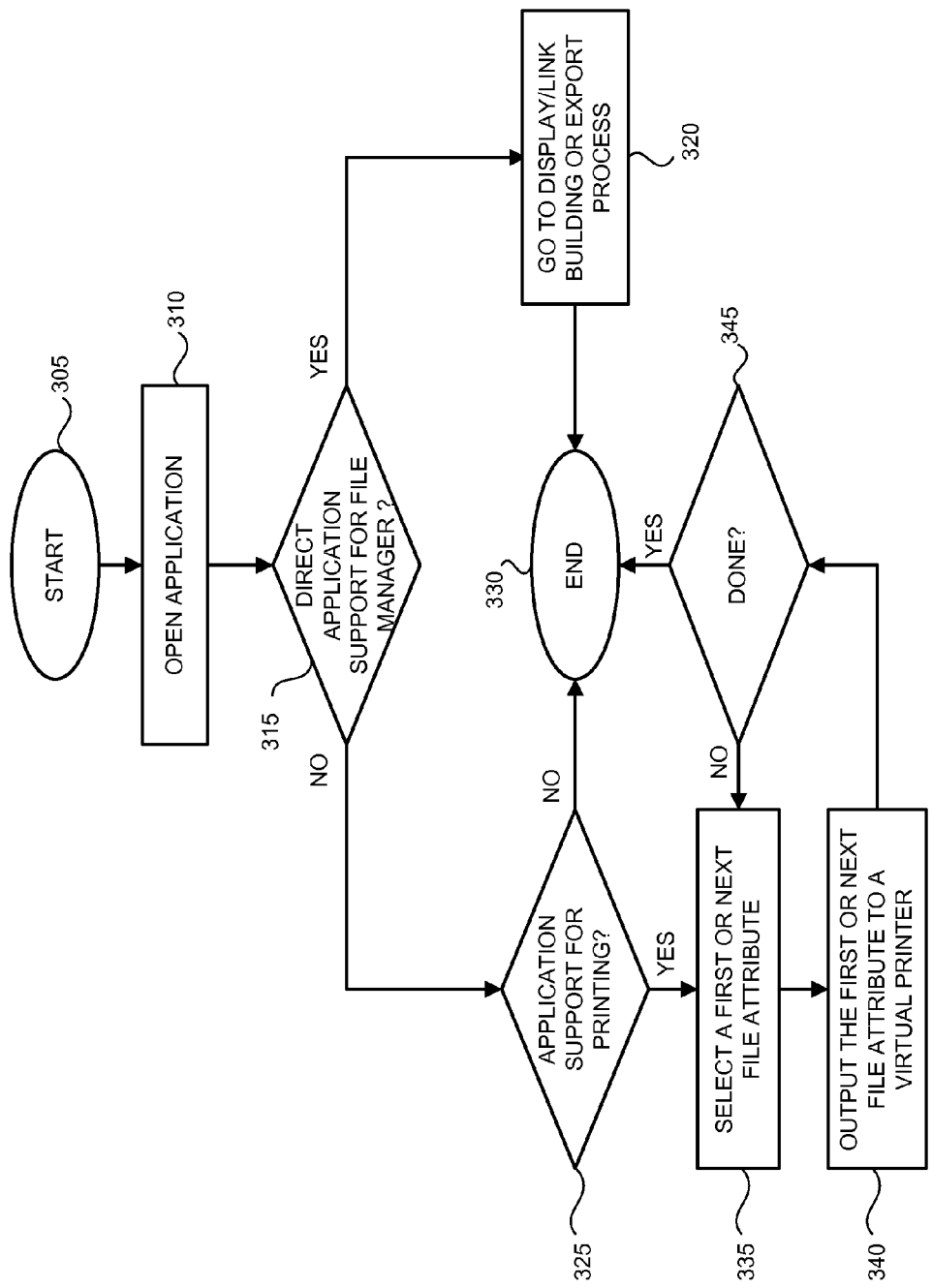
FIG. 3 is a flow diagram of an integration process, according to an embodiment of the invention.

FIG. 3 is a flow diagram of an integration process, according to an embodiment of the invention. In the embodiment illustrated in FIG. 3, an integration process begins in step 305, and then proceeds to open an application program in step 310. Next, in conditional step 315, the process determines whether there is direct application support for the FMS 105. Where there is direct application support for the FMS 105, the process advances to step 320 to execute a display/link building or export process before terminating in step 330. Otherwise, where there is not direct application support for FMS 105, the process advances to conditional step 325. In step 325, the process determines whether there is application support for printing. Where there is not such support, the process terminates in step 330. Otherwise, the process proceeds to step 335 to select a first or next file attribute data for printing. Then, in step 340, the process outputs the first or next file attribute data to a virtual printer. As used herein, a virtual printer is software whose user interface (UI) and/or application program interface (API) mimics a printer driver, but is configured to output data to a file rather than printer hardware. Step 340 may include, for instance, selecting the FMS 105 from a printer settings dialog box. Next, in conditional step 345, the process determines whether printing to the virtual printer is completed. Where it is not, the process returns to step 335; otherwise the process terminates in step 330. The illustrated process thus uses direct application support where it exists. Otherwise, the process provides integration via a virtual printer 170.

Figure 4:
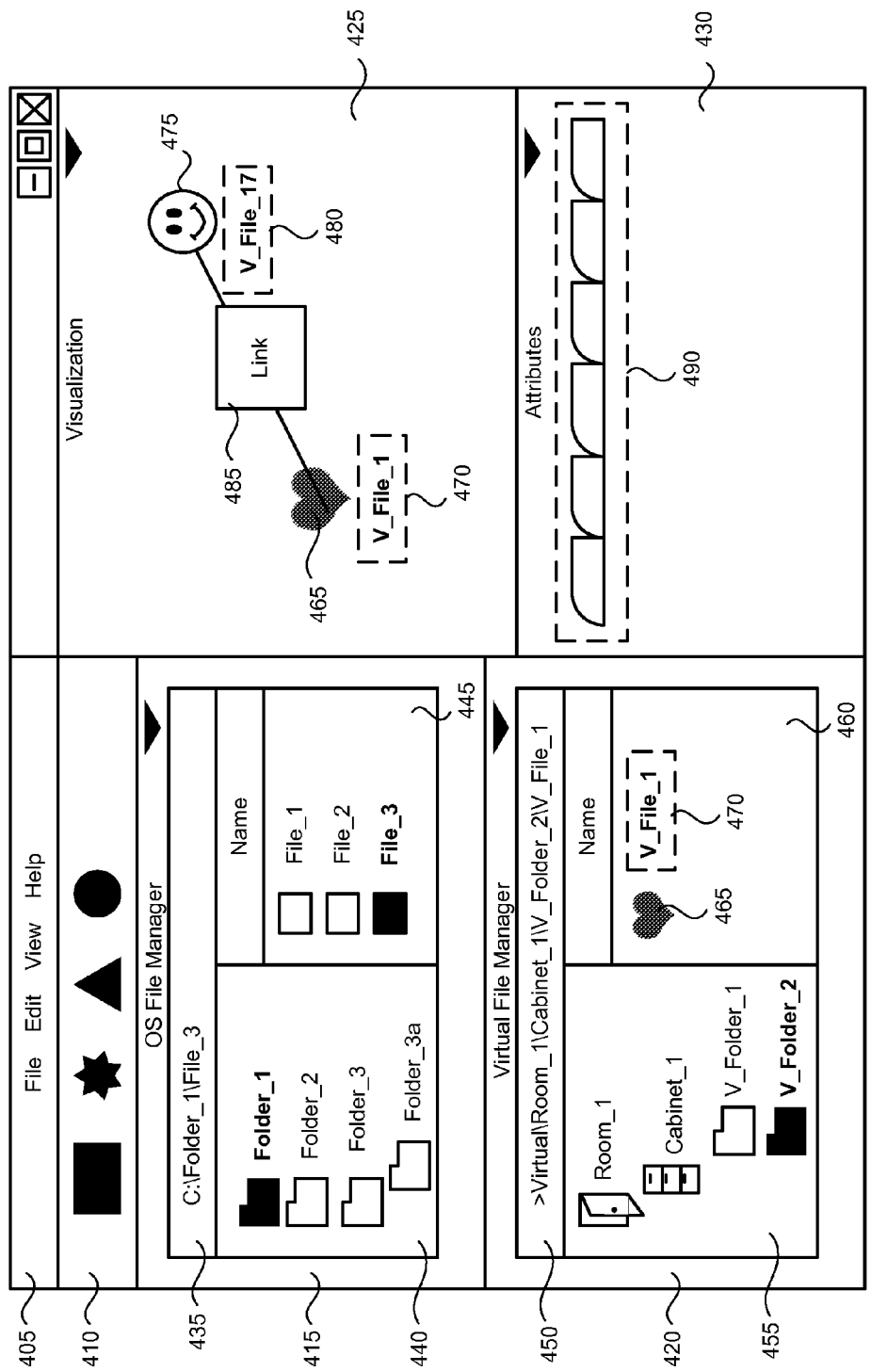
FIG. 4 is an illustration of a Graphical User Interface (GUI), according to an embodiment of the invention.

FIG. 4 is an illustration of a Graphical User Interface (GUI), according to an embodiment of the invention. The GUI in FIG. 4 is a representative user interface 115. The illustrated GUI includes a menu bar 405, quick access icons 410, operating system (OS) file manager window 415, virtual file manager window 420, visualization window 425, and attributes window 430. The OS file manager window 415 includes a system path area 435, a system folder area 440 and a system file area 445. The OS file manager window 415 and its components relate to the native operating system file structure.

The virtual file manager window 420 includes a virtual path area 450, a virtual folder area 455, and a virtual file area 460. In the illustrated embodiment, the virtual folder area 455 is organized in a room/cabinet/folder hierarchy. Each file in the virtual file area 460 includes a virtual file name 470 and may include a virtual file icon 465.

In operation, a user may use the GUI illustrated in FIG. 4 to build a virtual file structure in the virtual folder area 455 (for example, a room/cabinet/folder hierarchy, as shown). The user may then associate one of more system files with the virtual file structure, for instance by dragging and dropping a file from the system file area 445 to the virtual file area 460. Advantageously, a user may assign attributes to files that are represented in the virtual file manager window 420. For instance, a user may assign keywords, descriptions, labels, tags, and/or other file attributes to each virtual file. Examples of such file attributes will be provided in more detail below. A user may assign such file attributes, for example, by using a menu-based GUI feature and/or by completing a dialog box. The system may also assign or facilitate the assignment of file attributes such as author, editor, and/or dates of creation or edit. In embodiments of the invention, a user may also assign attributes to a group of files, for instance by first selecting a room, cabinet or folder associated with the group of files in the virtual folder area 455. In embodiments of the invention, the virtual file system module 130 supports multiple alternative virtual file systems that could be rendered in the virtual file manager window 420. In embodiments of the invention, such multiple alternative virtual file systems may be viewed concurrently (for example via multiple virtual file manager windows 420).

The visualization window 425 includes a graphical illustration of a first file that is logically associated with a second file via link 485. The first file is represented by a virtual file name 470 and virtual file icon 465. The second file is represented by a virtual file name 480 and virtual file icon 475. The GUI in FIG. 4 may be configured such that a user can drag and drop files from the virtual file area 460 to the visualization window 425. Thereafter, a user can form links between virtual files in the visualization window 425. The GUI may also permit a user to drag and drop a file from the system file area 445 to the visualization window 425. In this instance, the GUI may open a dialog box prompting the user to associate the selected file with a virtual file structure and/or to assign certain other file attributes. A process flow for such a configuration is described below with reference to FIGS. 13 and 14.

The visualization window 425 may also be configured so that a user can assign attributes to the link 485. For instance, a user may assign keywords, descriptions, labels, tags, and/or other attributes to each defined link. Examples of such link attributes will be provided in more detail below. A user may assign such link attributes, for example, by using a menu-based GUI and/or by completing a dialog box. The system may also assign or facilitate the assignment of link attributes such as author, editor, and/or dates of creation or edit. The types of link attributes need not be identical to the types of file attributes.

The attribute window 430 is configured to display attributes associated with a selected file or link. For instance, a user may select a file in the virtual file area 460 or in the visualization window 425. In this instance, the attributes window 430 will display attributes of the selected file. Alternatively, a user may select a link, for example in the visualization window 425. In this latter case, the attributes window 430 will display attributes associated with the selected link. The attributes window 430 includes tabs 490 for navigating between various views within the attributes window 430.

In embodiments of the invention, the virtual file system module 130 is interfaced to the virtual file manager window 420. Likewise, the visualization module 135 may be functionally connected to visualization window 425. The data store 120 may contain virtual file name, path and icon data displayed in the virtual file manager window 420 and visualization window 425, link name and logic displayed in the visualization window 425, and/or file and link attribute data that is displayed in the attributes window 430.

Figure 5:
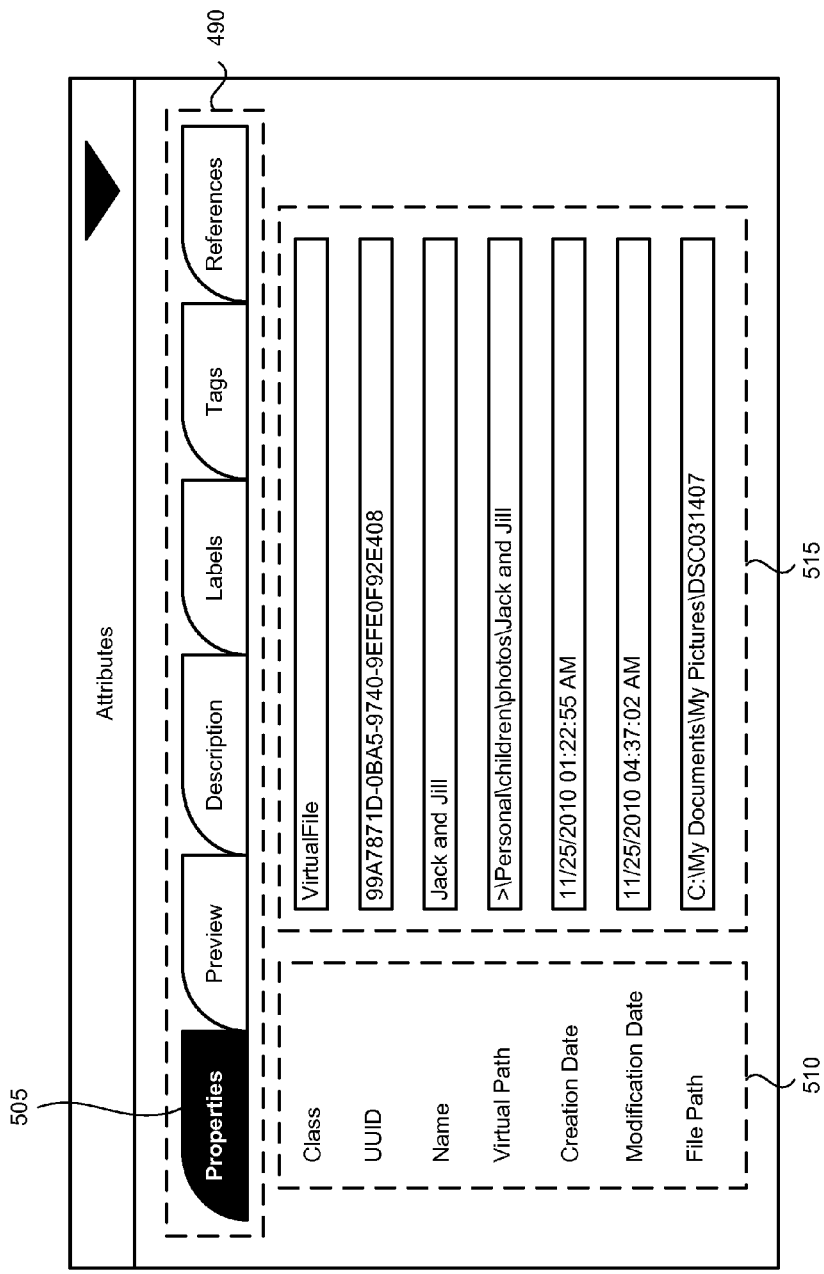
FIGS. 5-10 are illustrations of a portion of the GUI in FIG. 4, according to an embodiment of the invention.

FIGS. 5-10 are illustrations of a portion of the GUI in FIG. 4, according to an embodiment of the invention. More specifically, FIGS. 5-10 present different exemplary views of the attributes window 430. FIG. 5 shows that, in response to properties tab 505 selections, the attributes window 430 displays properties 510 and associated values 515 associated with a selected file or link. In embodiments of the invention, the particular display properties 510 may vary according to whether a file or link is selected. In embodiments of the invention, a user may also use the attributes window 430 to assign attributes to a selected file, group of files, or link.

Figure 6:
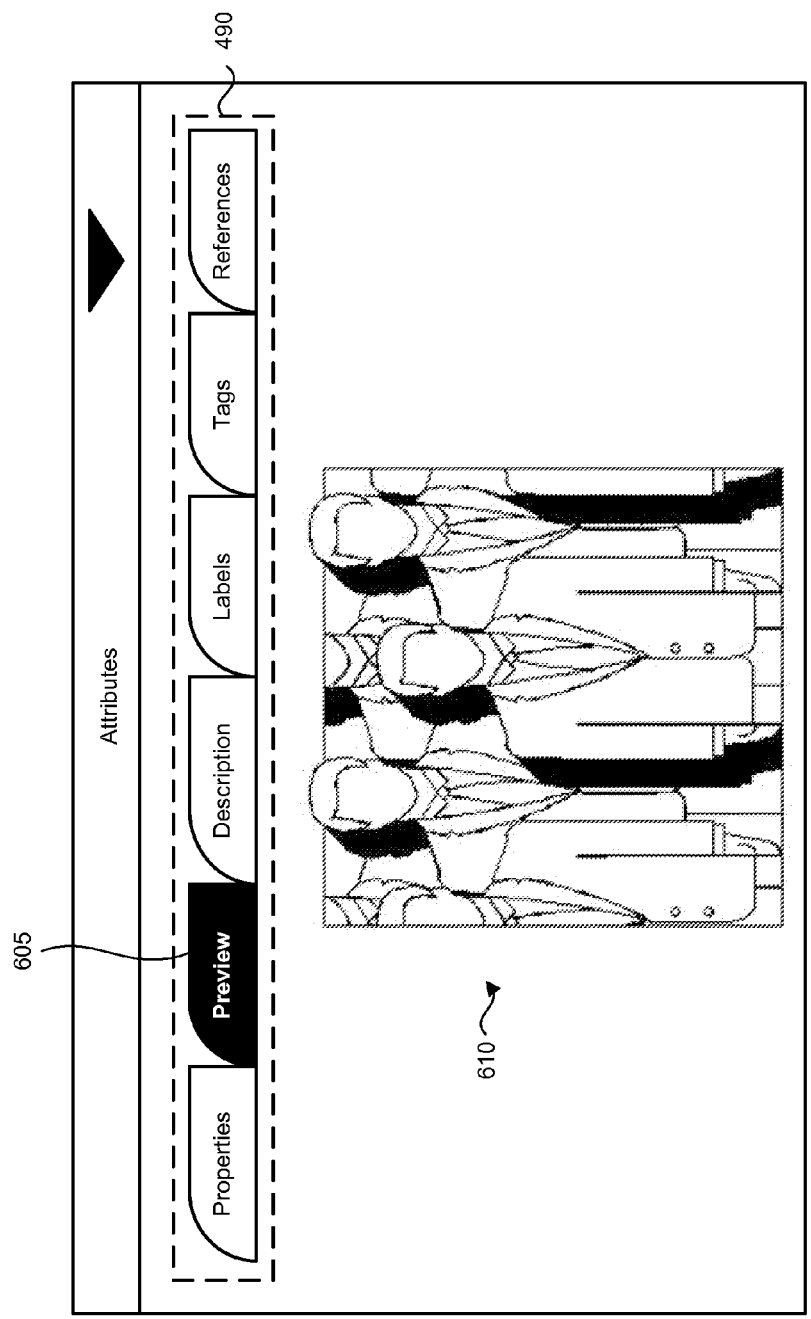

FIG. 6 illustrates that, in response to a preview tab 605 selection, the attributes window 430 displays a preview image 610 associated with the selected virtual file in the virtual file area 460. The preview image 610 could be, for instance, graphics or text. Preferably, the operation of the preview feature is independent of file type. Preview tab 605 may be completely omitted (not displayed) or non-functional where a user has selected a link rather than a file.

Figure 7:
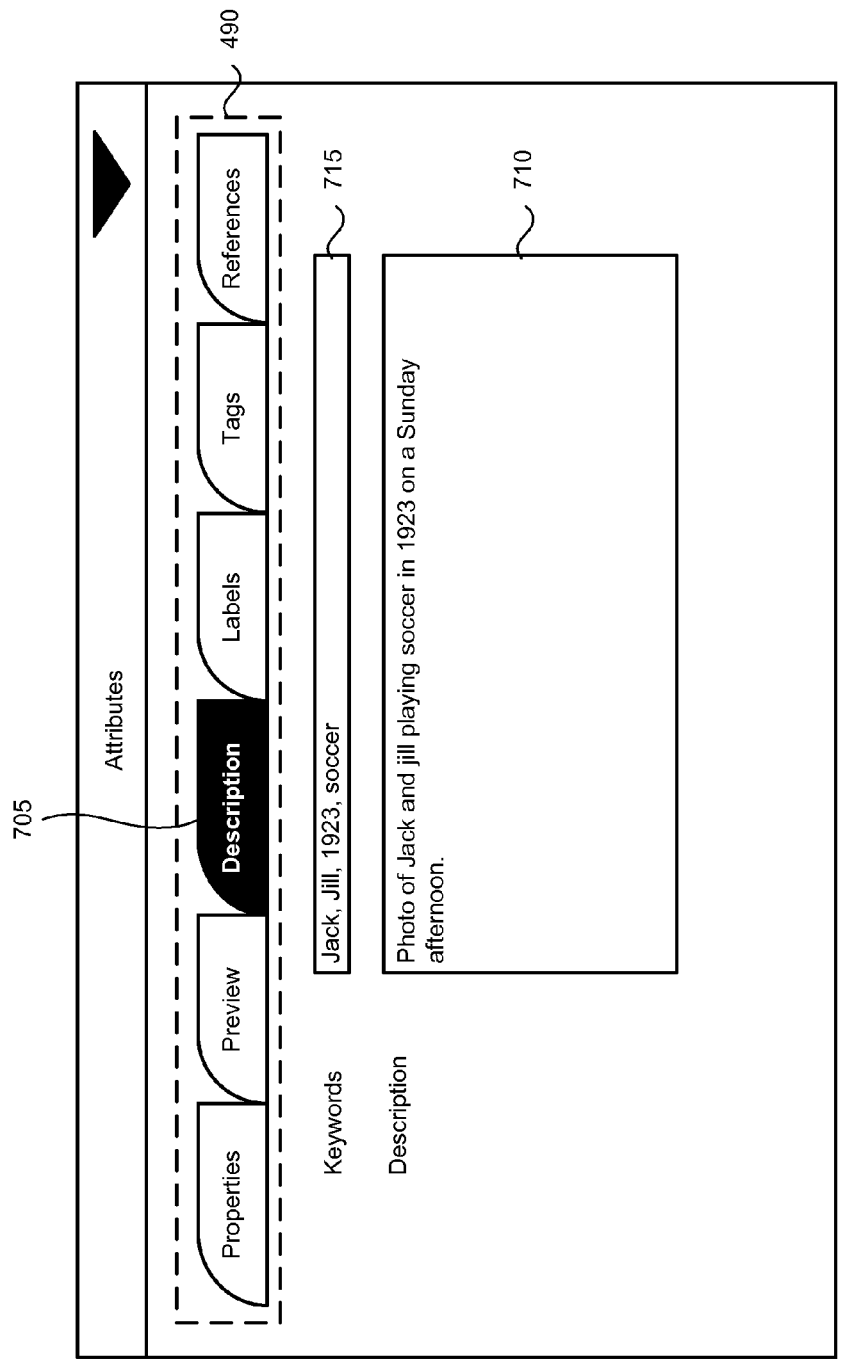

FIG. 7 demonstrates that, in response to a description tab 705 selections, the attributes window 430 may display keywords 715 and/or a textual description 710 associated with the selected file or link. Preferably, attributes associated with the description tab 705 are free-form keywords, key phrases, or descriptions of file content or link logic as illustrated by the keywords 715 and/or a textual description 710 examples.

Figure 8:
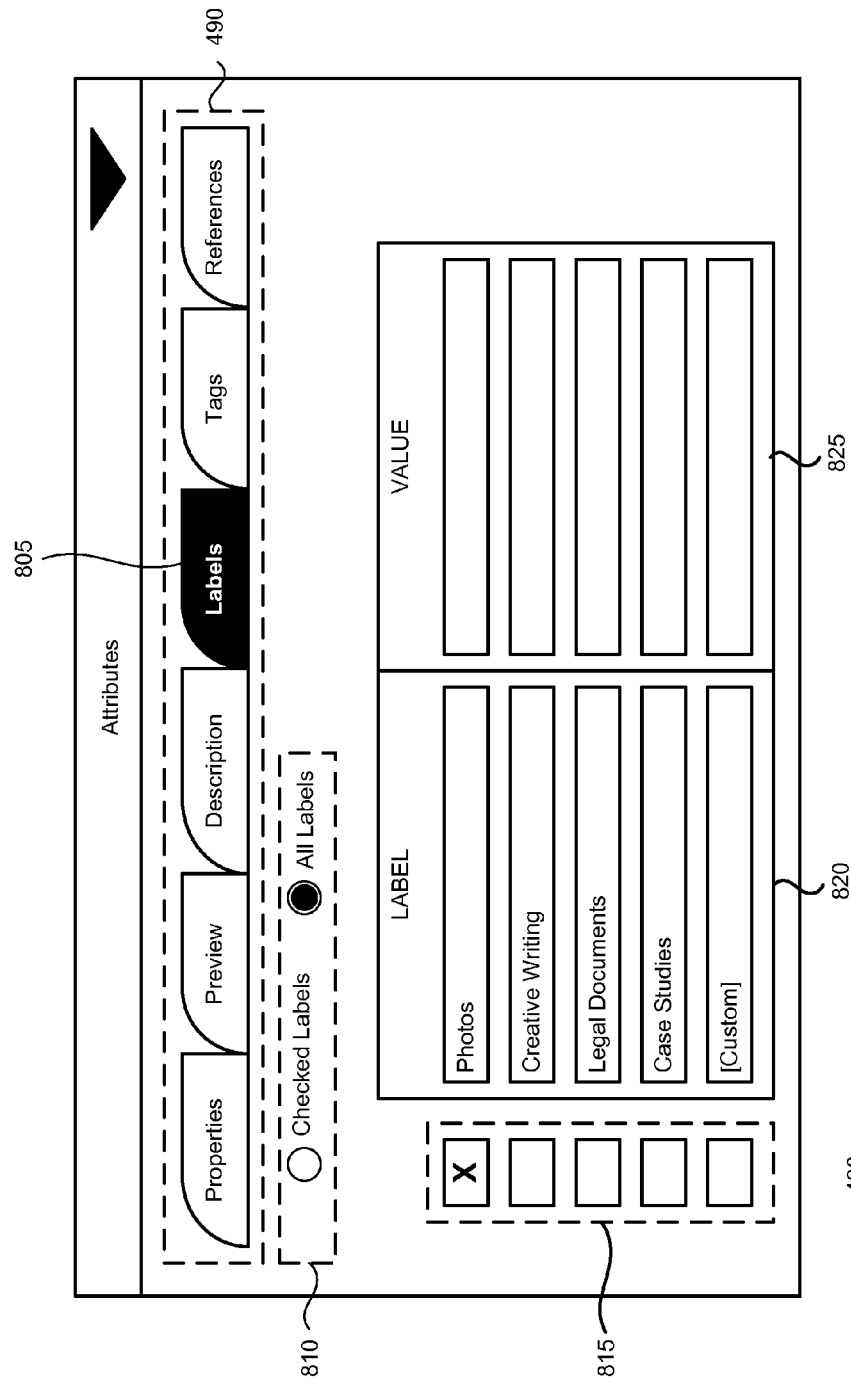

FIG. 8 shows that, in response to a labels tab 805 selection, the attributes window 430 displays checkbox tools 810 and 815, predefined and/or custom labels 820, and corresponding values 825 associated with the selected file or link. Attributes associated with the labels tab 805 preferably represent subject matter classifications. Such classifications may be pre-determined (for instance by an administrator or supervisor), or may be user-defined as indicated by the representative labels 820. The values 825 may also be user-defined and/or incident-based, and may be used on an optional basis.

Figure 9:
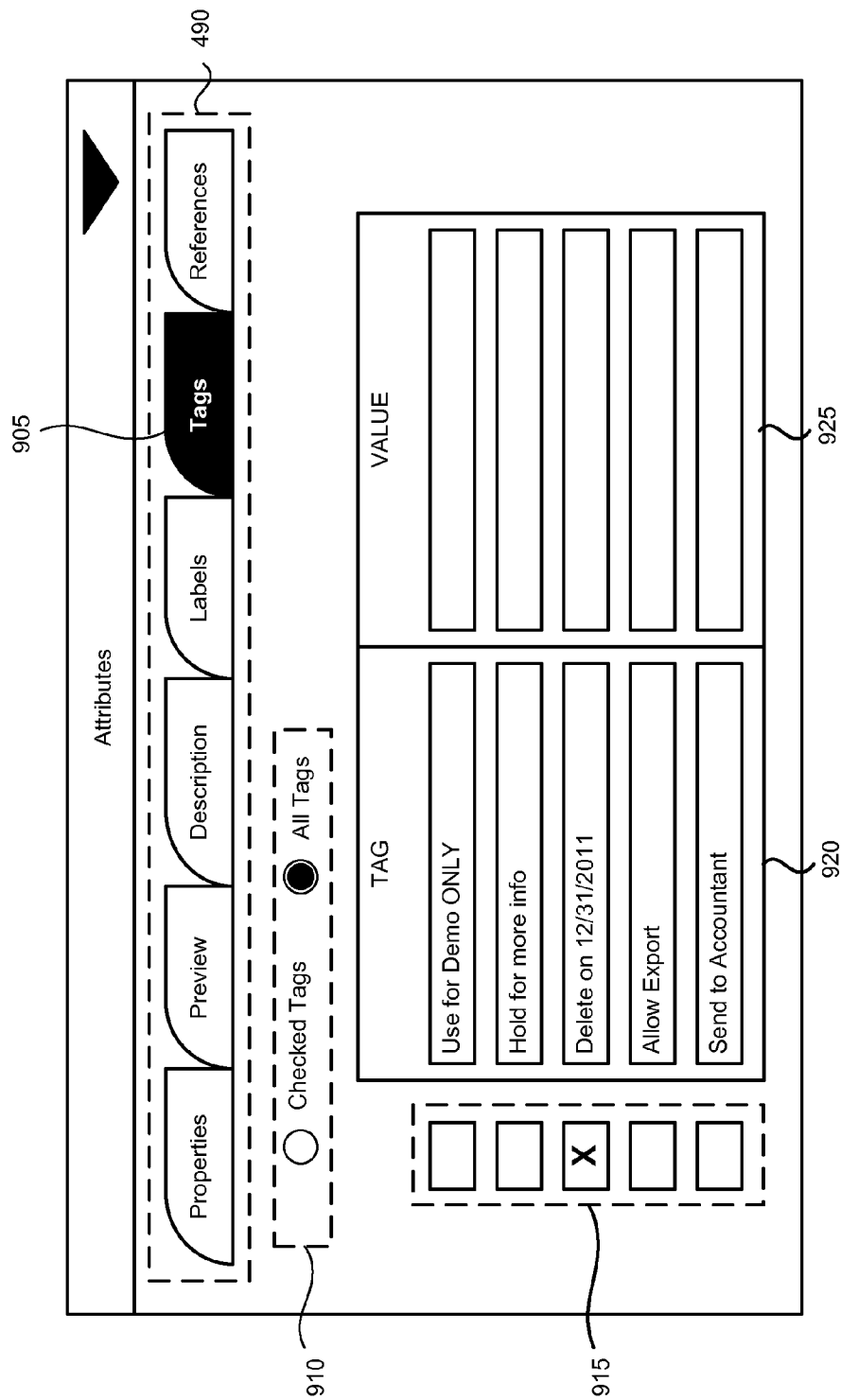

FIG. 9 illustrates that, in response to a tags tab 905 selections, the attributes window 430 displays checkbox tools 910 and 915, predefined and/or custom tags 920 and corresponding values 925 associated with the selected file or link. Attributes associated with the tags tab 905 preferably relate to planned actions or use restrictions, as illustrated by exemplary tags 920. The export tag will be discussed below with reference to FIGS. 18 and 19.

Figure 10:
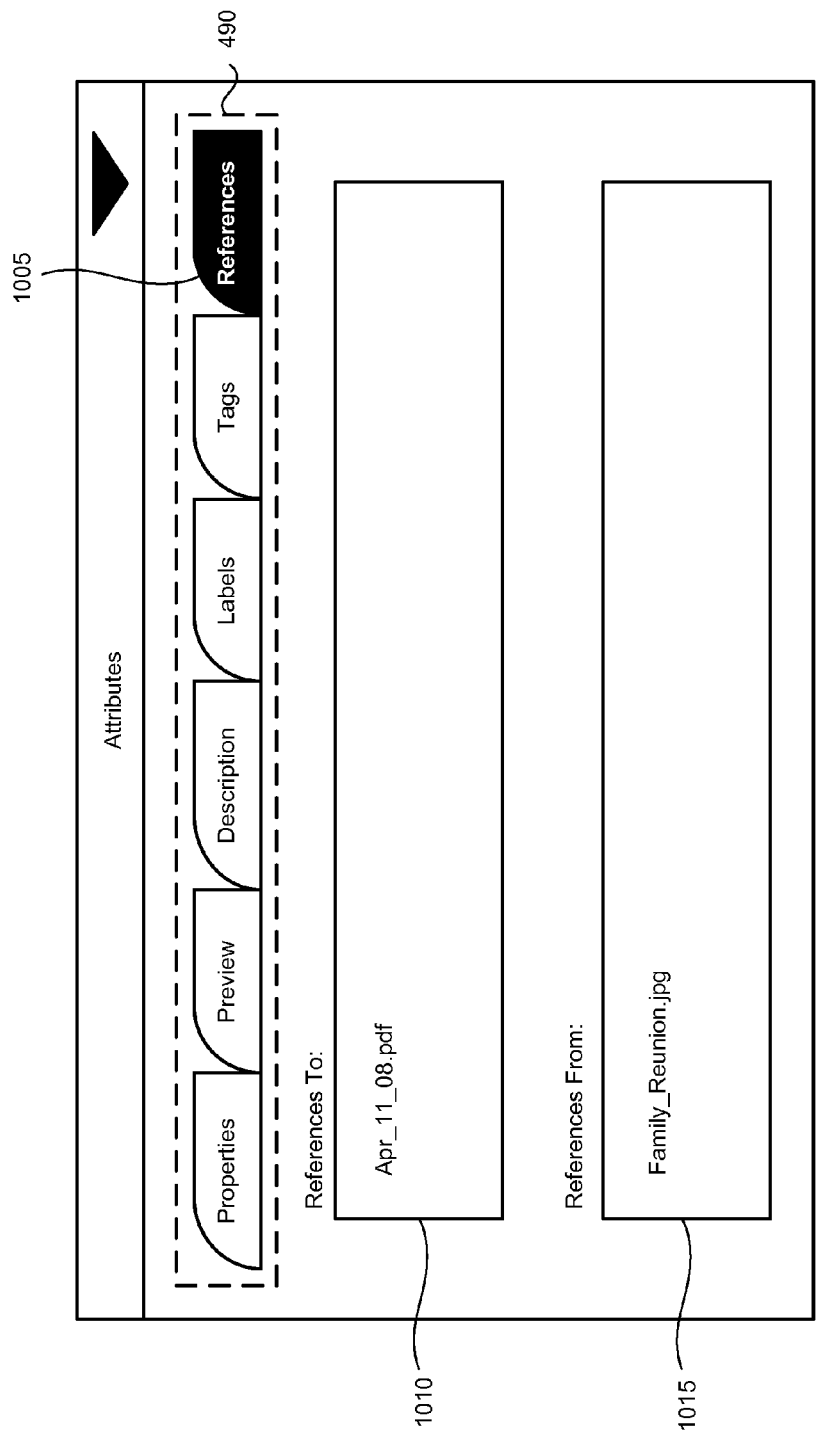

FIG. 10 demonstrates that, in response to references tab 1005 selection, the attributes window 430 may display reference attributes. As used herein, a reference is a file that is linked or associated with another file.

Where a user has selected a link prior to selecting references tab 1005, the attributes window will display two file names representing the corresponding two linked files. In embodiments where links have been assigned directionality, one of the two files will be designated a "from" file and the other will be a "to" reference. This is illustrated in FIG. 10, since the display includes a "from" filename 1015 and a "to" filename 1010. In this example, a user defined the selected link from "Family_Reunion.jpg" to "Apr_11_08.pdf." On the other hand, where a user has selected a file prior to selecting the references tab 1005, the attributes window 430 may display no references (for instance where no links have been defined that include the selected file). Alternatively, the attributes window could display one or more references. In embodiments that include link directionality, the attributes window 430 may or may not display one or more "from" references. In addition, the attributes window may or may not display one or more "to" references.

Other variations could exist in the operation of the references tab 1005. For instance, in an alternative embodiment of the invention, the attributes display could show not only one or more references, but also one or more file attributes of each displayed reference.

The attributes assigned to files and links, examples of which are illustrated in FIGS. 5-10 and discussed above, may be useful in locating, sorting, organizing, exporting and/or otherwise managing a particular file or group of files.

Figure 11:
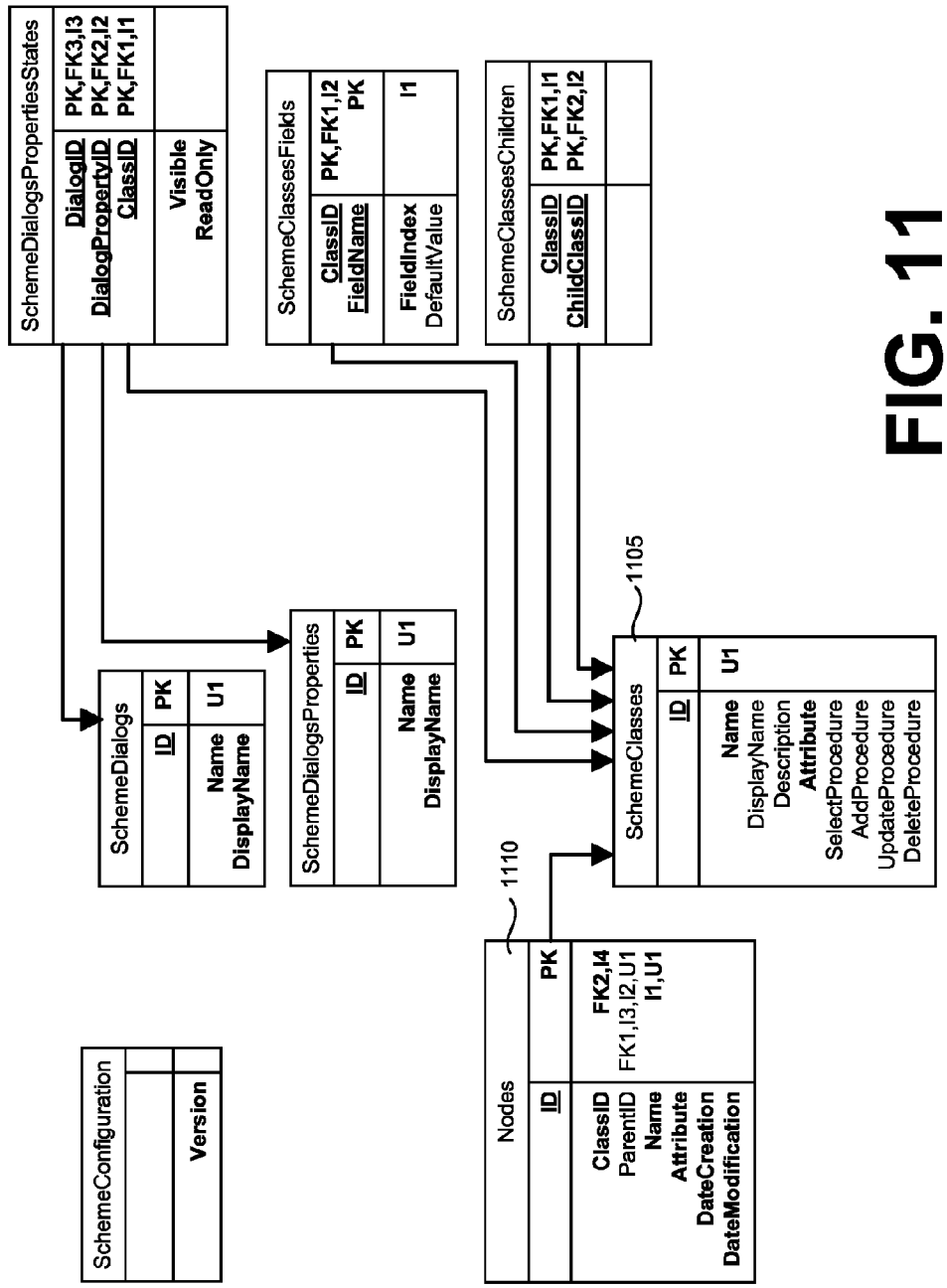
FIGS. 11 and 12 are an illustration of a database structure according to an embodiment of the invention.
Figure 12:
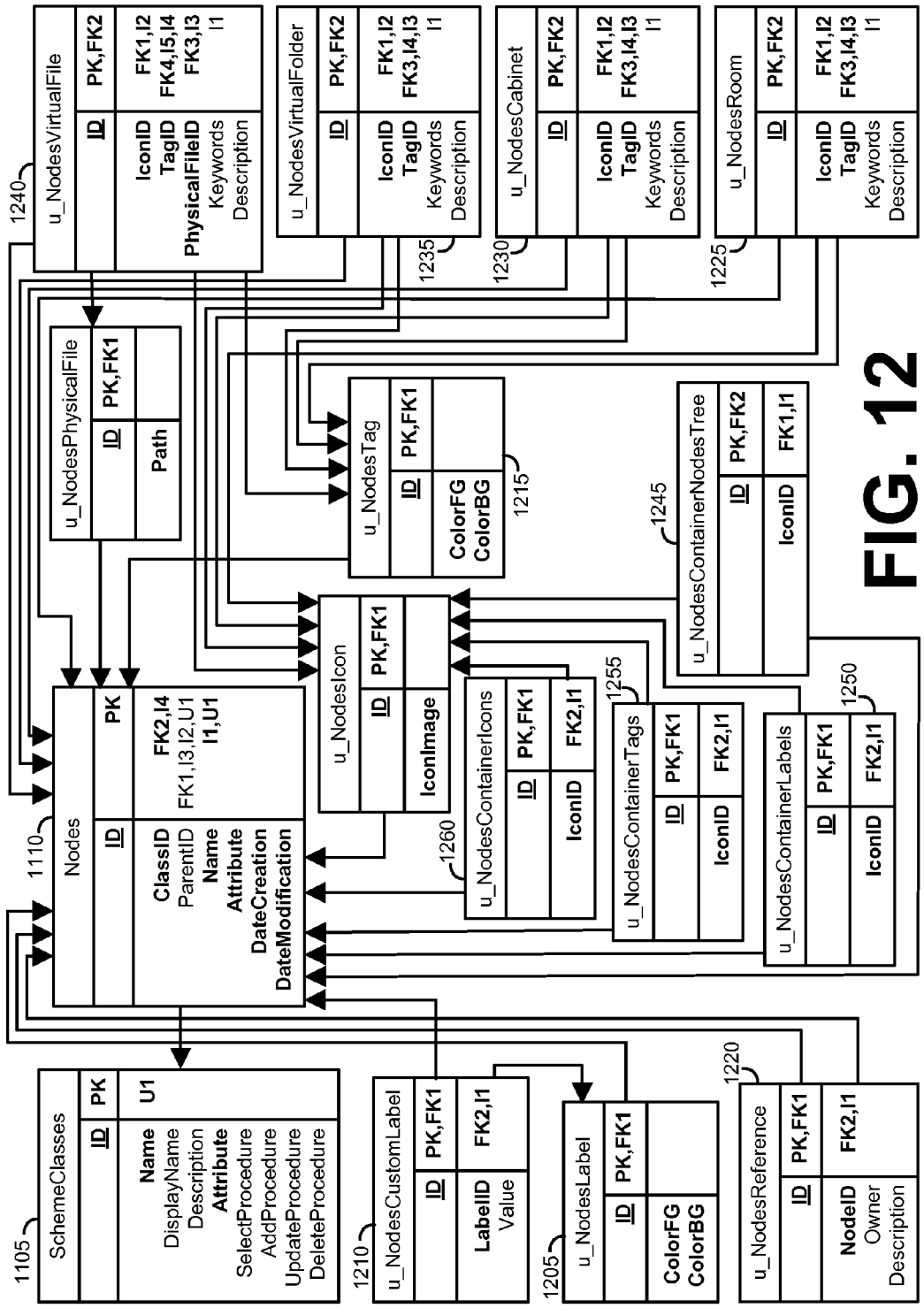

FIGS. 11 and 12 are an illustration of a database structure for the data store 120, according to an embodiment of the invention. SchemeClasses 1105 represents a relational model scheme for all files. Nodes 1110 represents the relational model scheme for each virtual file that may be defined by a user. Accordingly, the Nodes 1110 scheme is further defined by its relation to various classes. For example, the u_NodesRoom 1225, u_NodesCabinet 1230, and u_NodesVirtualFolder 1235 may each represent an organizational class of the virtual file structure illustrated in virtual folder area 455 of FIG. 4. The u_NodesVirtualFile 1240 may represent the class of user-defined virtual files illustrated in Virtual file area 460 of FIG. 4. u_NodesLabel 1205 and u_NodesCustomLabel 120 may represent classes of user-assigned label attributes described above with reference to FIG. 8. u_NodesTag 1215 may represent the class of user-assigned tag attributes discussed above with reference to FIG. 9. u_NodesReference may represent the class of user-assigned reference attributes discussed above with reference to FIG. 10. Containers 1245, 1250, 1255 and 1260 hold predefined tree elements, labels, tags and icons, respectively that a user may select when assigning attributes. In embodiments of the invention, the primary key PK used in the Nodes 1110 scheme is a UUID (also referred to herein as a key).

Figure 13:
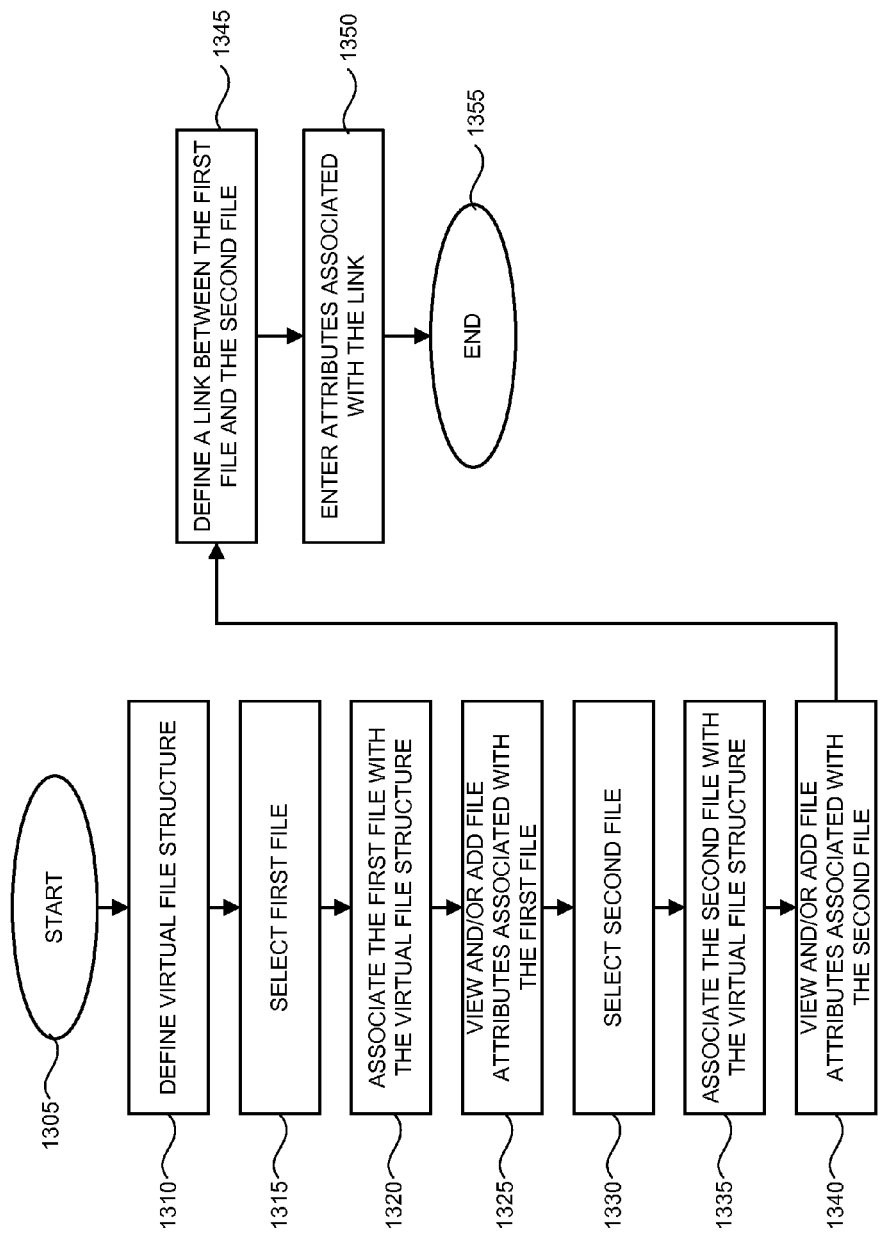
FIG. 13 is a flow diagram of a link building process from a user perspective, according to an embodiment of the invention.

FIG. 13 is a flow diagram of a link building process from a user perspective, according to an embodiment of the invention. As illustrated in FIG. 13, a link-building process begins in step 1305 and advances to step 1310 to define a virtual file structure. The virtual file structure may be, for instance, a room/cabinet/folder hierarchy as illustrated in the virtual folder area 455 of FIG. 4.

A user can then select a first file in step 1315 and associate the first file with the virtual file structure in step 1320. Selection step 1315 could include, for example, right clicking the first file in the system file area 445. Association step 1320 could include, for instance, dragging and dropping, or copying and pasting, the selected first file into the virtual file area 460. In step 1325, the user can view, edit and/or add attributes associated with the first file. The attributes may be, for instance, a description, labels, tags, and/or references (links) to one or more other files.

Similarly, a user can then select a second file in step 1330 and associate the second file with the virtual file structure in step 1335. Selection step 1330 could include, for example, right clicking the first file in the system file area 445. Association step 1335 could include, for instance, dragging and dropping, or copying and pasting, the selected second file into the virtual file area 460. In step 1340, the user can view, edit and/or add attributes associated with the first file. The attributes may be, for instance, a description, labels, tags, and/or references (links) to one or more other files.

In embodiments of the invention, the selection steps 1315 and/or 1330 could include searching for a file either in the native operating system (OS) file manager (e.g., MS Windows Explorer) or in a virtual file system. Association steps 1320 and/or 1335 may not be necessary for files already associated with at least one virtual file system (e.g., a file selected by a user in the virtual file area 460). In embodiments of the invention, steps 1325 and/or 1340 could be executed using attribute window 430 and/or the dialog window described below with reference to FIG. 15.

Subsequent to step 1340, a user may define a link between the first file and the second file in step 1345, and then enter attributes associated with the link in step 1350 before terminating the process in step 1355. Link defining step 1345 may include dragging and dropping the first and second files into the visualization window 425. In one embodiment, link defining step 1345 includes dragging and dropping the first file into the visualization window 425, and then dragging and dropping the second file into the visualization window 425 on top of the first file. In embodiments of the invention, step 1350 could be executed using attribute window 430 and/or the dialog window described below with reference to FIG. 15.

Figure 14:
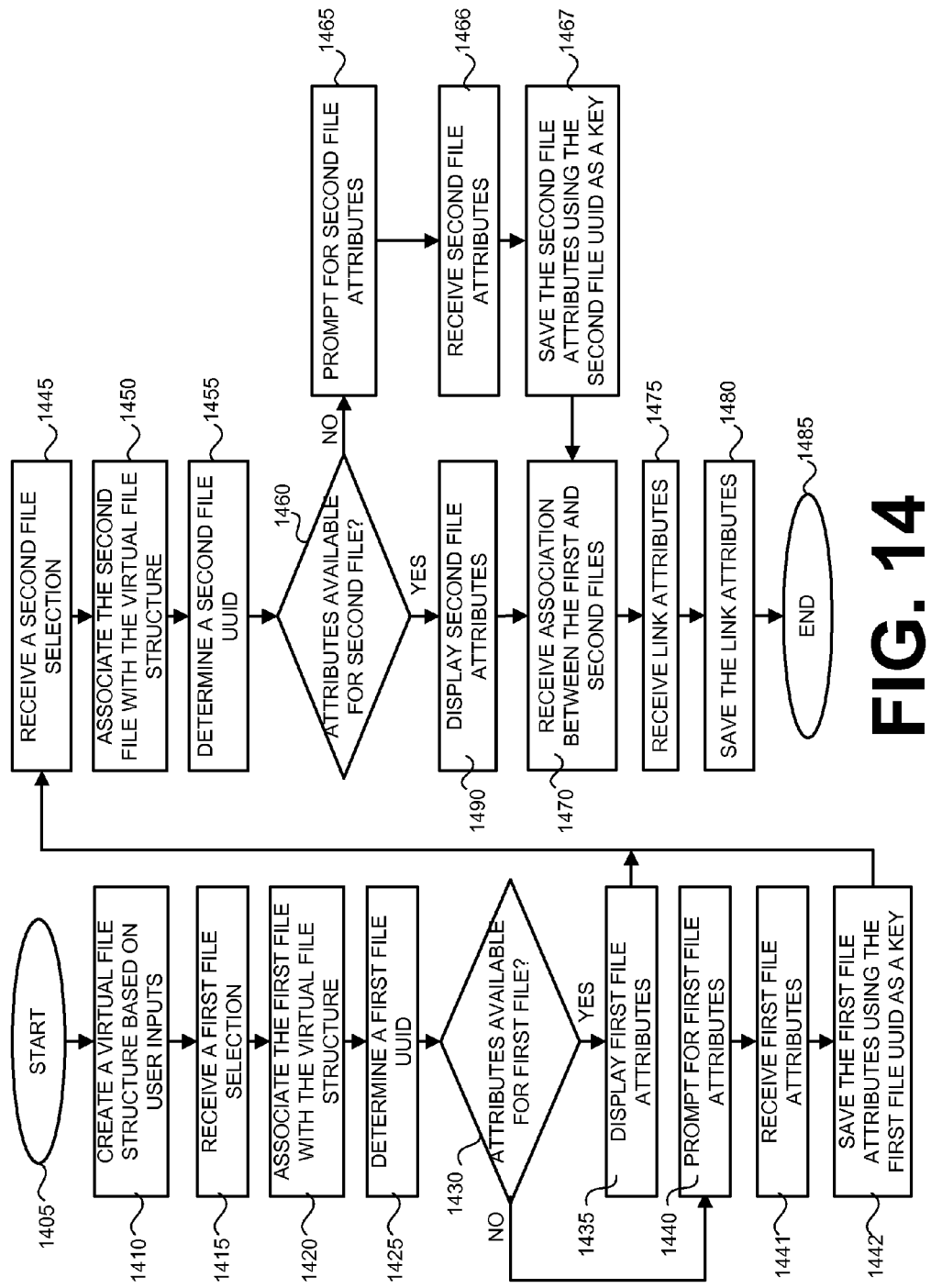
FIG. 14 is a flow diagram of a link building process from a system perspective, according to an embodiment of the invention.

FIG. 14 is a flow diagram of a link building process from a system perspective, according to an embodiment of the invention. As illustrated in FIG. 10, the link display/building process begins in step 1405. The process creates a virtual file structure based on user inputs in step 1410. The virtual file structure may be, for instance, a room/cabinet/folder hierarchy as illustrated in the virtual folder area 455 of FIG. 4. Next, the process receives a first file selection from a user in step 1415 and associates the first file with the virtual file structure based on user commands in step 1420. If the first selected file is a virtual file, then step 1420 is not necessary. The process determines a first file UUID in step 1425, for instance by reading the first file UUID from a predetermined header location of the first file. Step 1425 may also include generating the first file UUID and writing the first file UUID to a header of the first file as described below with reference to FIGS. 16 and 17.

In conditional step 1430, the process determines whether one or more attributes are associated with the first file. Step 1430 can be performed, for instance, by reading the data store 120 using the first file UUID as a database key. Where the result of conditional step 1430 is satisfied, the process may display the one or more first file attributes in step 1435 before advancing to step 1445 to receive a second file selection.

Where the result of conditional step 1430 is not satisfied, the process may prompt a user to input first file attributes in step 1440. The process may then receive the first file attributes in step 1441 and save the first file attributes using the first file UUID as a data store key in step 1442 before advancing to step 1445.

The process receives a second file selection from the user in step 1445 and associates the second file with the virtual file structure in step 1450 based on user commands. If the second selected file is a virtual file, then step 1450 is not necessary. The process determines a second file UUID in step 1455, for instance by reading the second file UUID from a predetermined header location of the second file. Step 1445 may also include generating the second file UUID and writing the second file UUID to a header of the second file as described below with reference to FIGS. 16 and 17.

In conditional step 1460, the process determines whether one or more attributes are associated with the second file. Step 1460 can be performed, for instance, by reading the data store 120 using the second file UUID as a database key. Where the result of conditional step 1460 is satisfied, the process may display the one or more second file attributes in step 1490.

Where the result of conditional step 1460 is not satisfied, the process may prompt a user to input second file attributes in step 1465. The process may then receive the second file attributes in step 1466 and save the second file attributes using the second file UUID as a data store key in step 1467.

Subsequent to steps 1467 or 1490, the process may receive an association (or link) between the first and second files in step 1470. Step 1470 may be enabled by the visualization window 425 GUI. The process receives link attributes in step 1475 and saves the link attribute data to a data store in step 1480 before terminating in step 1485. The definition of a link also creates file attributes; accordingly, step 1480 may include storing reference attributes for both the first file and the second file (the first file becomes a reference attribute of the second file, and the second file becomes a reference attribute of the first file).

Variations to the process illustrated in FIG. 14 are possible. For example, steps 1410, 1420, and 1450 may not be required where a virtual file structure has already been defined, and where the first file and the second file are virtual files with the predefined virtual file structure. Moreover, the process may not prompt a user to input file attributes in steps 1440 and/or 1465. Display steps 1435 and/or 1490 could also allow a user to edit the displayed file attribute data. Where the process does prompt the user for file or link attribute data, steps 1440, 1465 and/or 1475 could include displaying a dialog window similar to the one described below with reference to FIG. 15.

Figure 15:
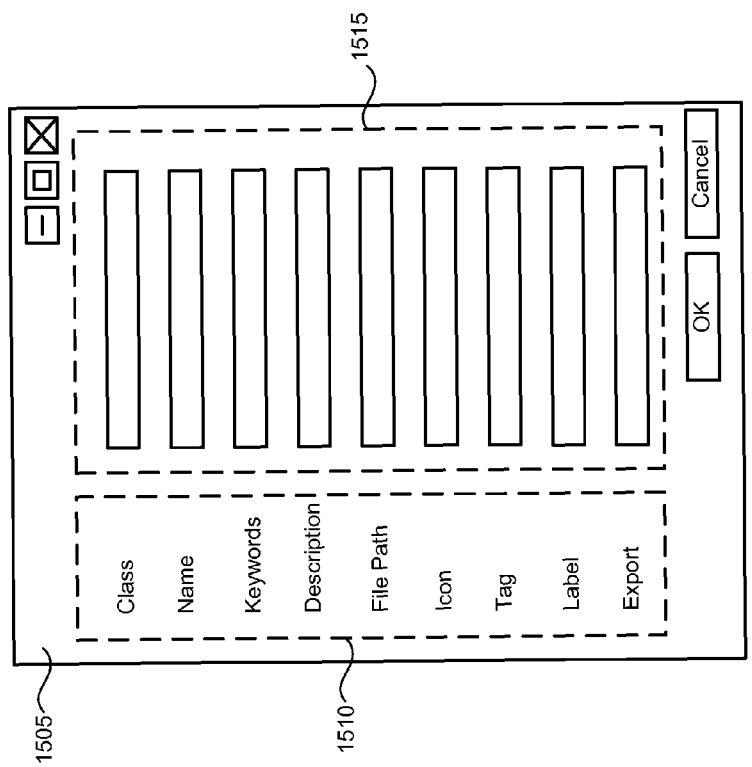
FIG. 15 is an illustration of an attribute dialog window, according to an embodiment of the invention.

FIG. 15 is an illustration of an attribute dialog window, according to an embodiment of the invention. As shown therein, a dialog window 1505 may include a listing of multiple attribute types 1510 and a corresponding listing of multiple attribute values 1515. In embodiments of the invention, one or more of the multiple attribute values 1515 may be automatically assigned. The multiple attribute types 1510 could vary between files and links.

Figure 16:
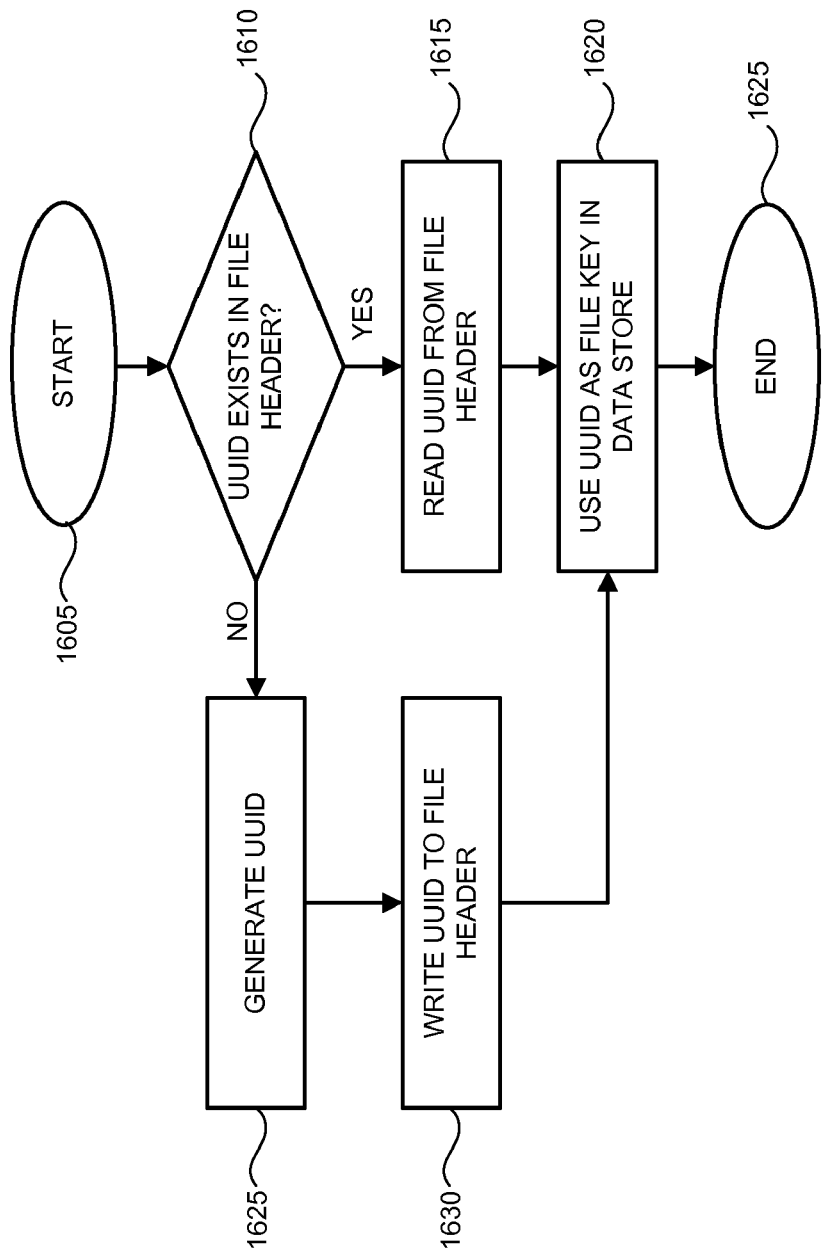
FIG. 16 is a flow diagram of a process for determining a file key from a system perspective, according to an embodiment of the invention.

FIG. 16 is a flow diagram of a process for determining a file key, according to an embodiment of the invention. The process in FIG. 16 may be executed by the file key determining module 205, and is one way to implement determining steps 1425 and 1455. As illustrated in FIG. 16, the process for determining a file key begins in step 1605, and then advances to conditional step 1610. In conditional step 1610, the process determines whether a Universally Unique Identifier (UUID) exists in a file header. Where the result of conditional step 1110 is not satisfied, the process generates a UUID in step 1125. Step 1125 may generate a UUID, for example, in accordance with the time-based version described in Request for Comment (RFC) memorandum 4122. The process then writes the generated UUID to the file header in step 1630 before using the UUID as a file key in a data store (for instance to store file attribute data) in step 1620 and terminating in step 1625. Where the result of conditional step 1610 is satisfied, the process reads the existing UUID from the file header in step 1115 before advancing to step 1620. The above-described process thus assigns or reads a UUID in a file header rather than identifying a file by file name.

Variations for the process illustrated in FIG. 16 and described above are possible. For instance, reading step 1615 could be a part of conditional step 1610. In this case, the process could advance to step 1620 if the read is successful, and go to step 1625 if the read operation fails. In addition, UUID generation step 1625 could instead produce a UUID having a name-based, random, or pseudo-random format as described in RFC 4122. RFC 4122 is hereby incorporated into this specification by reference for all that it discloses about UUID formats. Other UUID formats could also be used, according to design choice.

Figure 17:
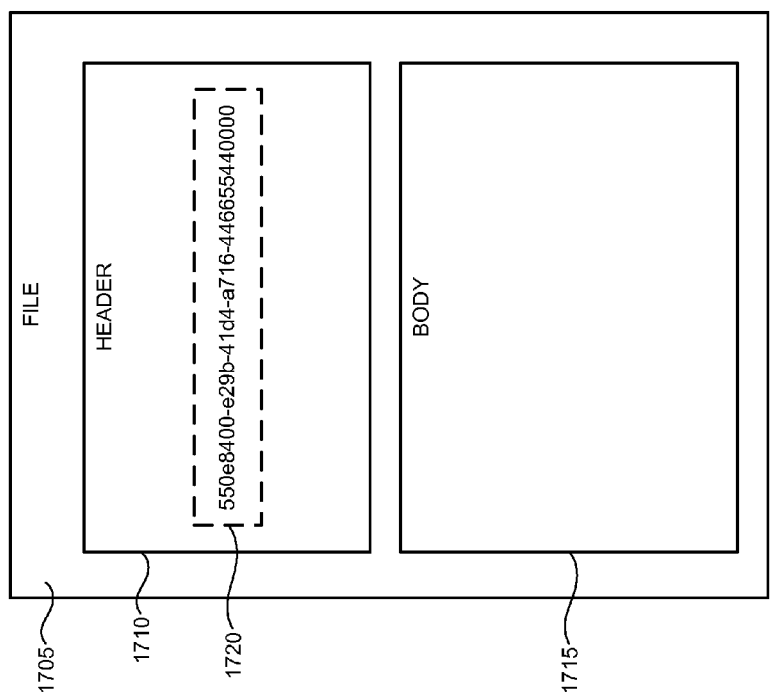
FIG. 17 is an illustration of a file structure, according to an embodiment of the invention.

FIG. 17 is an illustration of a file structure, according to an embodiment of the invention. FIG. 17 illustrates that a file 1705 may include a header 1710 and a body 1715. The header 1710 may include a UUID string 1720.

Figure 18:
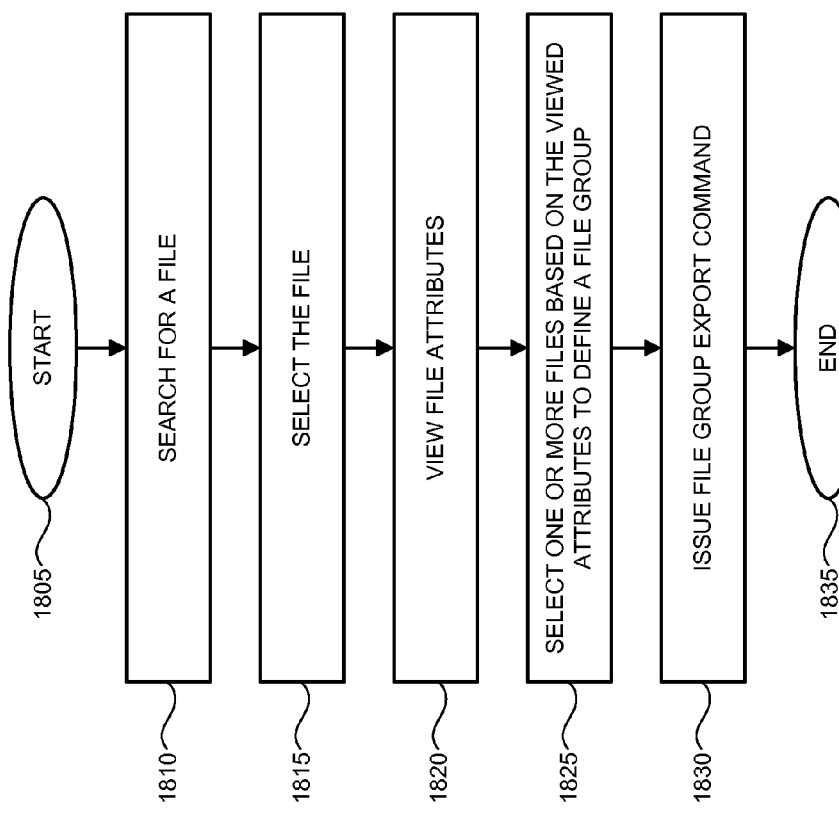
FIG. 18 is a flow diagram of an export process from a user perspective, according to an embodiment of the invention.

FIG. 18 is a flow diagram of an export process from a user perspective, according to an embodiment of the invention. As illustrated in FIG. 18, an export process may begin in step 1805, and then a user may search for a file in step 1810. The search process in step 1810 may be based on one or more predetermined file attributes. A user may select a file in step 1815 and then view file attributes associated with the selected file in step 1820. Next, in step 1825, a user may select one or more files and/or associated attributes for export based on the viewed attributes to define a file group. Then a user may issue a file group export command in step 1830 before terminating the process in step 1835. The file group export command could direct the export of files, file attributes, or some combination of files and file attributes, according to the user's instructions.

Variations to the process illustrated in FIG. 18 and described above are possible. For instance, in an alternative embodiment, the search step 1810 could be used to identify a group of files. In this case, steps 1815 and/or 1820 may be omitted. In embodiments of the invention, the search step 1810 and/or the export selection step 1825 may also include link attributes in combination with file attributes. For instance, a user might wish to export all files labeled "2010 taxes" with all related link attributes except for "link authors."

Figure 19:
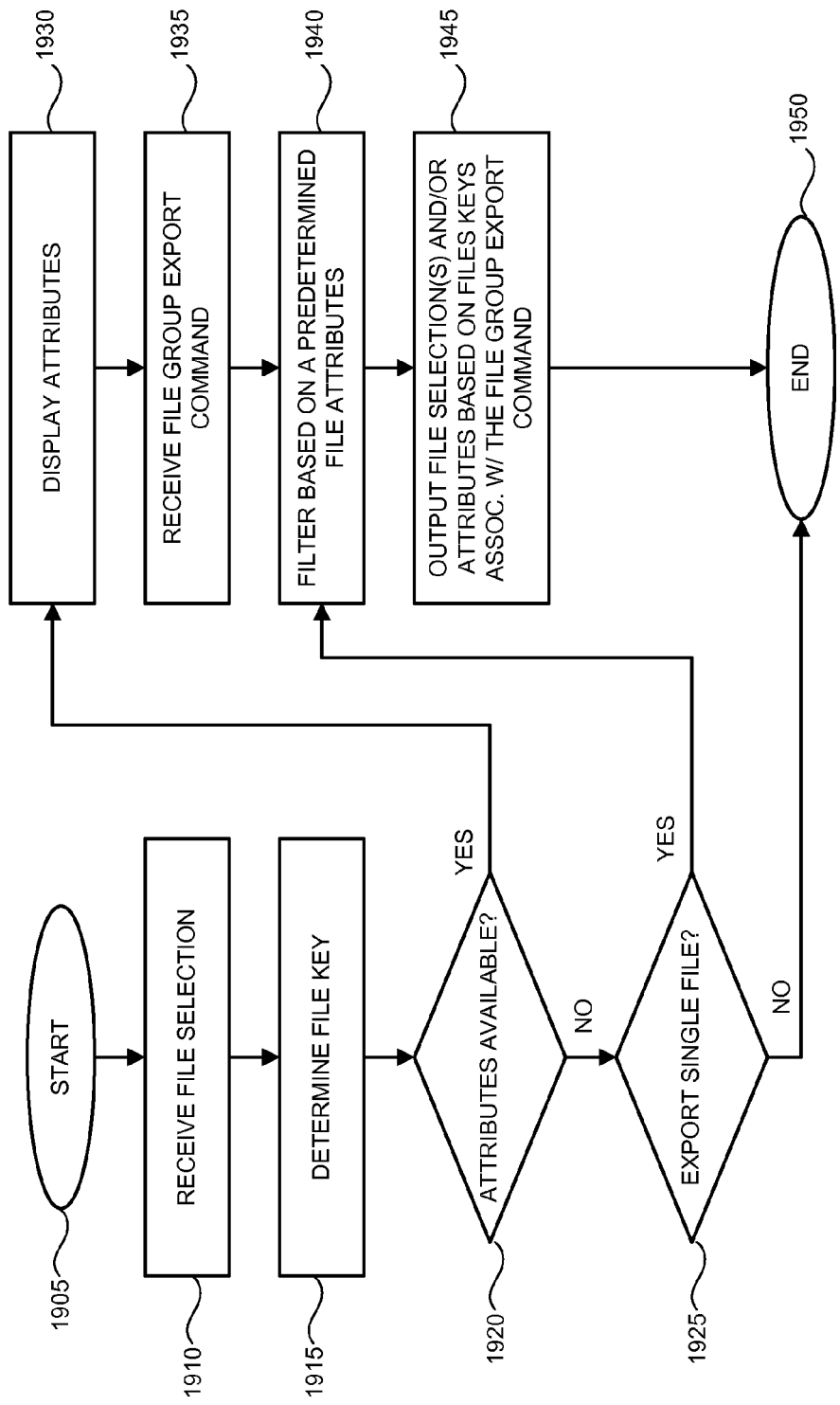
FIG. 19 is a flow diagram of an export process from a system perspective, according to an embodiment of the invention.

FIG. 19 is a flow diagram of an export process, according to an embodiment of the invention. The process in FIG. 19 is presented from the perspective of a system. As illustrated in FIG. 19, an export process may begin in step 1905, and then receive a file selection in step 1910. Next, the process may determine a file key in step 1915. Step 1915 may be performed, for instance, using the process described above with reference to FIG. 16. Next, in conditional step 1920, the process determines whether attributes are associated with the selected file. Step 1920 may by performed by searching the data store 120 with the key. Where the condition in step 1920 is not satisfied, the process advances to conditional step 1925 to determine whether to export a single file. Where the result of conditional step 1925 is not satisfied, the process terminates in step 1950. Where the result of conditional step 1920 is satisfied, the process advances to step 1930 to display file attributes. Then, the process receives a file group export command in step 1935 and filters the file group based on predetermined file export attributes in step 1940. The process outputs one or more filtered files and/or attribute data in step 1945 before terminating in step 1950. Where the result of conditional step 1925 is satisfied, the process also advances to step 1940.

Figure 20:
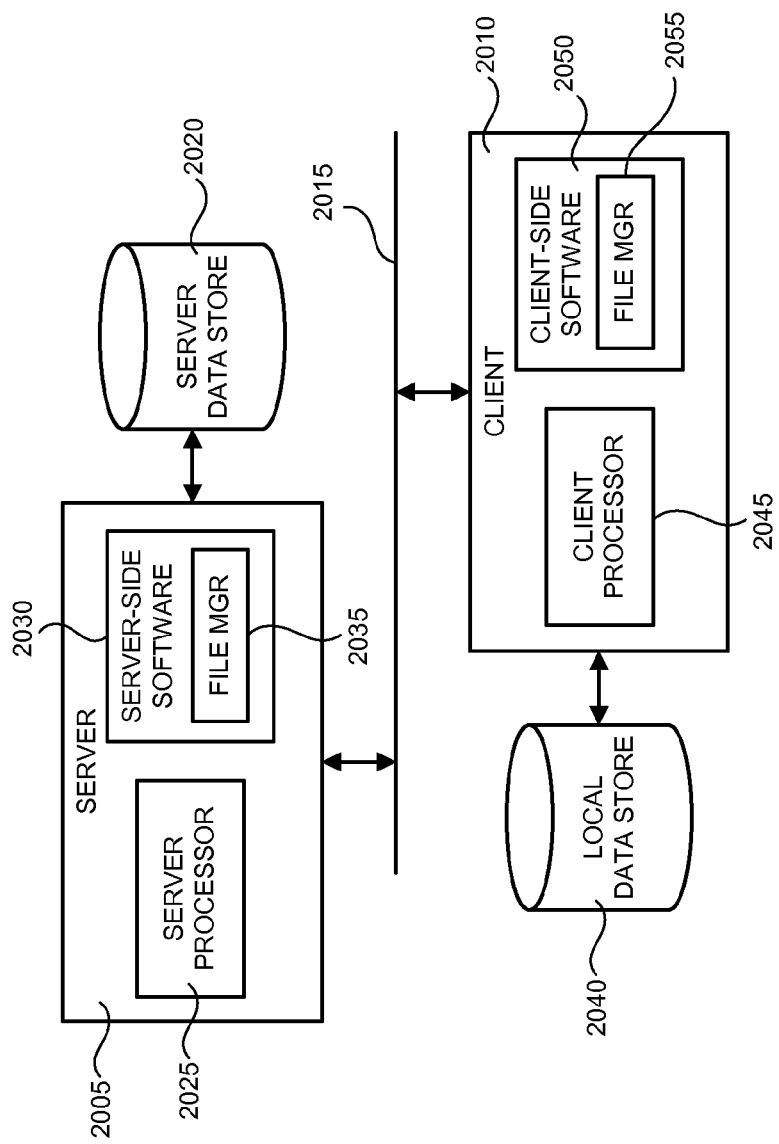
FIG. 20 is a functional block diagram of an enterprise system, according to an embodiment of the invention.

FIG. 20 is a functional block diagram of an enterprise system, according to an embodiment of the invention. As illustrated in FIG. 20, a system may include a server 2005 coupled to a client 2010 via a network 2015. The server 2005 may include a server processor 2025 and server-side software 2030. The server-side software 2030 may further include a file manager 2035. The server 2005 may further be coupled to a server data store 2020. The client 2010 may include a client processor 2045 and client-side software 2050. The client-side software 2050 may include a file manager 2055. The client 2010 may be further coupled to a local data store 2040.

The enterprise illustrated in FIG. 20 and described above may include one or more functional components illustrated in FIG. 1 and FIG. 2. For instance, in one embodiment, the server-side software 2030, file manager 2035 and server data store 2020 may be configured to implement the functions of the file management system (FMS) 105, integration components 110 and/or user interface 115. In an alternative embodiment, the client-side software 2050, file manager 2055 and local data store 2040 may be configured to implement the functions of the FMS 105, integration components 110 and/or user interface 115. In yet another embodiment, the server 2005, server data store 2020, client 2010, and local data store 2040 may cooperate to execute the function of the FMS 105, integration components 110 and/or user interface 115.

Any of the functions described herein, for instance with reference to FIGS. 1-10, 14-16, 19 and 20, may be implemented in hardware, software, or a combination of hardware and software, according to design choice.

Embodiments of the invention provide, among other things, an improved system and method for building logical associations (links) between files and for assigning attributes to the files and/or links. As described above, such attributes may include, for instance, keywords, descriptions, labels, tags, and/or other attributes. In one respect, such attributes improve the way that files can be searched, exported, or otherwise managed. Moreover, in embodiments of the invention, the attribute data is stored separately from the file and indexed according to UUID's in the header of each corresponding file. Thus, renaming, moving, and/or encrypting a file does not destroy the attribute data that has previously been associated with the file.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims. In addition, although references are made to embodiments of the invention, all embodiments disclosed herein need not be separate embodiments. In other words, many of the features disclosed herein can be utilized in combinations not expressly illustrated.

I claim:

1. A file management system comprising:
    a virtual file system module configured to provide at least one abstraction of a plurality of files;
    a media retrieval/storage engine coupled to the virtual file system module; and
    a data store coupled to the media retrieval/storage system, the data store configured to store file attribute data associated with each of the plurality of files, each of the plurality of files having a universally unique identifier (UUID) in a header, the UUID being independent of a filename, the file attribute data indexed in the data store using the UUID as a unique key.

2. The file management system of claim 1, wherein the file attribute data includes at least one of a keyword, a description, a label, and a tag.

3. The file management system of claim 1, wherein the file attribute data associated with a first one of the plurality of files includes a logical reference to a second one of the plurality of files.

4. The file management system of claim 1, wherein the UUID is time-based.

5. The file management system of claim 1, wherein the UUID is name-based, a namespace associated with the name-based UUID being independent of the filename.

6. The file management system of claim 1, further comprising a visualization module coupled to the virtual file system, the visualization module configured to allow a user to define a logical link between a selected pair of the plurality of files.

7. The file management system of claim 6, wherein the data store is configured to store at least one logical link attribute, the at least one logical link attribute including at least one of a keyword, a description, a label and a tag.

8. The file management system of claim 1, further comprising a file key determining module coupled to the virtual file system module and the media retrieval/storage engine, the file key determining module configured to perform a file key determining process, the file key determining process including:
   determining whether the UUID exists in a header of a selected one of the plurality of files; and
   if the UUID does not exist, generating the UUID and writing the generated UUID to the header of the selected one of the plurality of files.

9. The file management system of claim 1, the file management system configured to execute a process, the process including:
   creating a virtual file structure based on user inputs;
   receiving a first file selection, the first file being one of the plurality of files;
   associating the first file with the virtual file structure;
   determining a first file UUID;
   receiving first file attributes; and
   saving the first file attributes in the data store using the first file UUID as the unique key.

10. The file management system of claim 9, the process further including:
   receiving a second file selection, the second file being one of the plurality of files;
   associating the second file with the virtual file structure;
   determining a second file UUID;
   receiving second file attributes; and
   saving the second file attributes in the data store using the second file UUID as the unique key.

11. The file management system of claim 10, the process further including:
   receiving a logical association between the first and second files, the logical association being a link;
   receiving link attributes; and
   saving the link attributes in the data store.

12. The file management system of claim 11, wherein the link attributes includes at least one of a keyword, a description, a label, and a tag.

13. The file management system of claim 11, the process further including saving file attributes, wherein saving the file attributes includes:
   saving indicia of the first file as the file attribute of the second file; and
   saving indicia of the second file as the file attribute of the first file.

14. The file management system of claim 1, further including a graphical user interface (GUI) module coupled to the virtual file system module, the GUI module configured to display an operating system (OS) file manager window, at least one virtual file manager window, a visualization window, and an attributes window.

15. The file management system of claim 14, wherein the GUI module is configured such that a user can drag and drop each of the plurality of files from the OS file manager window to the at least one virtual file manager window.

16. The file management system of claim 14, wherein the GUI module is configured such that a user can drag and drop each of the plurality of files from the at least one virtual file manager window to the visualization window.

17. The file management system of claim 14, wherein the GUI module is configured such that a user can define a logical link between any two of the plurality of files represented in the visualization window.

18. The file management system of claim 14, wherein the GUI module is configured such that a user can:
   select one of the plurality of files in the at least one virtual file manager window; and
   view the file attribute data associated with the selected one of the plurality of files in the attributes window.

19. The file management system of claim 14, wherein the GUI module is configured such that a user can:
   select one of the plurality of files in the visualization window; and
   view the file attribute data associated with the selected one of the plurality of files in the attributes window.

20. The file management system of claim 14, wherein the GUI module is configured such that a user can:
   select a logical link in the visualization window; and
   view link attribute data associated with the selected link in the attributes window.

* * * * *

UNITED STATES PATENT AND TRADEMARK OFFICE
CERTIFICATE OF CORRECTION

PATENT NO. : 8,180,814 B1
APPLICATION NO. : 13/028773
DATED : May 15, 2012
INVENTOR(S) : Paul Stuart Swengler It is certified that error appears in the above-identified patent and that said Letters Patent is hereby corrected as shown below:

In the drawings, Sheet 16, Fig. 16, reference numeral "1625" as applied to the end (termination) step should read --1635--.

In column 8: lines 63 and 64, "conditional step 1110" should read --conditional step 1610--; lines 64 and 65, "step 1125", both occurrences, should read --step 1625--.

In column 9: lines 3 and 4, "terminating in step 1625" should read --terminating in step 1635--; line 6, "step 1115" should read --step 1615--.

Signed and Sealed this
Twenty-sixth Day of June, 2012

David J. Kappos
*Director of the United States Patent and Trademark Office*